United States Patent
Fay et al.

(10) Patent No.: US 11,783,057 B2
(45) Date of Patent: Oct. 10, 2023

(54) METHOD FOR SECURELY PROVISIONING A DEVICE INCORPORATING AN INTEGRATED CIRCUIT WITHOUT USING A SECURE ENVIRONMENT

(71) Applicant: NXP B.V., Eindhoven (NL)

(72) Inventors: Björn Fay, Brande-Hörnerkirchen (DE); Miroslav Knezevic, Bee Cave, TX (US); Durgesh Pattamatta, Camas, WA (US); Alexander Vogt, Hamburg (DE)

(73) Assignee: NXP B.V., Eindhoven (NL)

( * ) Notice: Subject to any disclaimer, the term of this patent is extended or adjusted under 35 U.S.C. 154(b) by 259 days.

(21) Appl. No.: 17/445,742

(22) Filed: Aug. 24, 2021

(65) Prior Publication Data

US 2023/0063743 A1 Mar. 2, 2023

(51) Int. Cl.
*G06F 21/00* (2013.01)
*G06F 21/60* (2013.01)
*H04L 9/06* (2006.01)
*H04L 9/08* (2006.01)
*H04L 9/32* (2006.01)
*G06F 8/61* (2018.01)

(52) U.S. Cl.
CPC .......... *G06F 21/602* (2013.01); *H04L 9/0637* (2013.01); *H04L 9/085* (2013.01); *H04L 9/0861* (2013.01); *H04L 9/0894* (2013.01); *H04L 9/3247* (2013.01); *G06F 8/61* (2013.01)

(58) Field of Classification Search
None
See application file for complete search history.

(56) References Cited

U.S. PATENT DOCUMENTS

| | | |
|---|---|---|
| 9,043,604 B2 | 5/2015 | Brickell et al. |
| 9,094,205 B2 | 7/2015 | Hartley et al. |
| 9,100,174 B2 | 8/2015 | Hartley et al. |
| 9,100,189 B2 | 8/2015 | Hartley et al. |
| 9,129,536 B2 | 9/2015 | Tkacik et al. |
| 10,516,654 B2 | 12/2019 | Zhao et al. |
| 2008/0092210 A1 | 4/2008 | Tobita et al. |

(Continued)

FOREIGN PATENT DOCUMENTS

| | | |
|---|---|---|
| EP | 3444999 A1 | 2/2019 |
| EP | 3457310 A1 | 3/2019 |

*Primary Examiner* — Andrew J Steinle
(74) *Attorney, Agent, or Firm* — Daniel D. Hill

(57) ABSTRACT

A method is provided for secure provisioning of a device. In the method, a plurality of integrated circuit (IC) devices is manufactured by a first entity for use in the device. The first entity provides signed provisioning software and stores in at least one provisioning IC device one or more keys used for provisioning the plurality of ICs. The provisioning device with the signed provisioning software is provided to a second entity. The second entity verifies the provisioning software using a stored key. The provisioning software encrypts provisioning assets provided by the second entity and provides the encrypted provisioning assets to the third entity. The signed provisioning software is provided to a third entity by the first entity. During manufacturing of the manufactured products by the third entity, the provisioning software verifies and decrypts the encrypted provisioning assets of the second entity to provision all the plurality of IC devices.

20 Claims, 5 Drawing Sheets

(56) References Cited

U.S. PATENT DOCUMENTS

| | | | |
|---|---|---|---|
| 2014/0068246 A1* | 3/2014 | Hartley | H04L 9/0866 |
| | | | 713/176 |
| 2014/0164779 A1* | 6/2014 | Hartley | H04L 9/0866 |
| | | | 713/176 |
| 2016/0171223 A1* | 6/2016 | Covey | G06F 21/572 |
| | | | 713/189 |
| 2016/0352514 A1 | 12/2016 | Huang et al. | |
| 2019/0097818 A1 | 3/2019 | Lu et al. | |

* cited by examiner

METHOD FOR SECURELY PROVISIONING A DEVICE INCORPORATING AN INTEGRATED CIRCUIT WITHOUT USING A SECURE ENVIRONMENT

BACKGROUND

Field

This disclosure relates generally to electronic circuits and more specifically to a method for securely provisioning a device incorporating an integrated circuit (IC) without using a secure environment.

Related Art

Trust provisioning is a process in which secret assets are generated and installed on a device for the first time after its production. A first phase of trust provisioning is typically done during a manufacturing process of the IC where a (cryptographic) device identity and a key-pair are created, together with a certificate for a public key signed by the IC manufacturer (ICM) and installed on the IC. That initial phase of trust provisioning allows an original equipment manufacturer (OEM) to verify the origin of received devices before continuing with their own trust provisioning. During the second phase of trust provisioning, the OEM verifies that the public key of the device has indeed been signed by the ICM. Once that is verified, the OEM is assured that the device is genuine. That is, that the device comes from the genuine ICM, and the OEM proceeds with installing its own key material, code, and configuration data.

In practice, the OEM will often carry out the second phase of the trust provisioning process in an environment where the OEM's devices are being assembled. The OEM may use the service of a third-party provider, a so-called contract manufacturer (CM) where the OEM does not have full control over the trust provisioning process. Therefore, it should be assumed that the second phase of trust provisioning is happening in an untrusted environment.

To deal with this issue, the OEM typically needs to invest in expensive trust provisioning equipment, which comprises an online hardware security module (HSM) and secure provisioning equipment. The HSM is meant to protect OEM's assets against a malicious party operating in the untrusted CM facility. The online HSM will securely connect to the OEM's trust provisioning infrastructure to receive the keys, code, and data and then use secure provisioning equipment to securely provision all the devices.

Other solutions for provisioning the device use the same secrets for all OEMs and CMs or even static keys for firmware decryption. This can be very risky as one leaked or extracted key is enough to break the firmware protection for all OEMs.

Other solutions may require the CM to get access to the secrets owned by the OEM which is not desirable because the CM may be an untrusted third party as discussed above.

Therefore, a need exists for a low-cost alternative to HSM-based trust provisioning in an untrusted CM facility.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
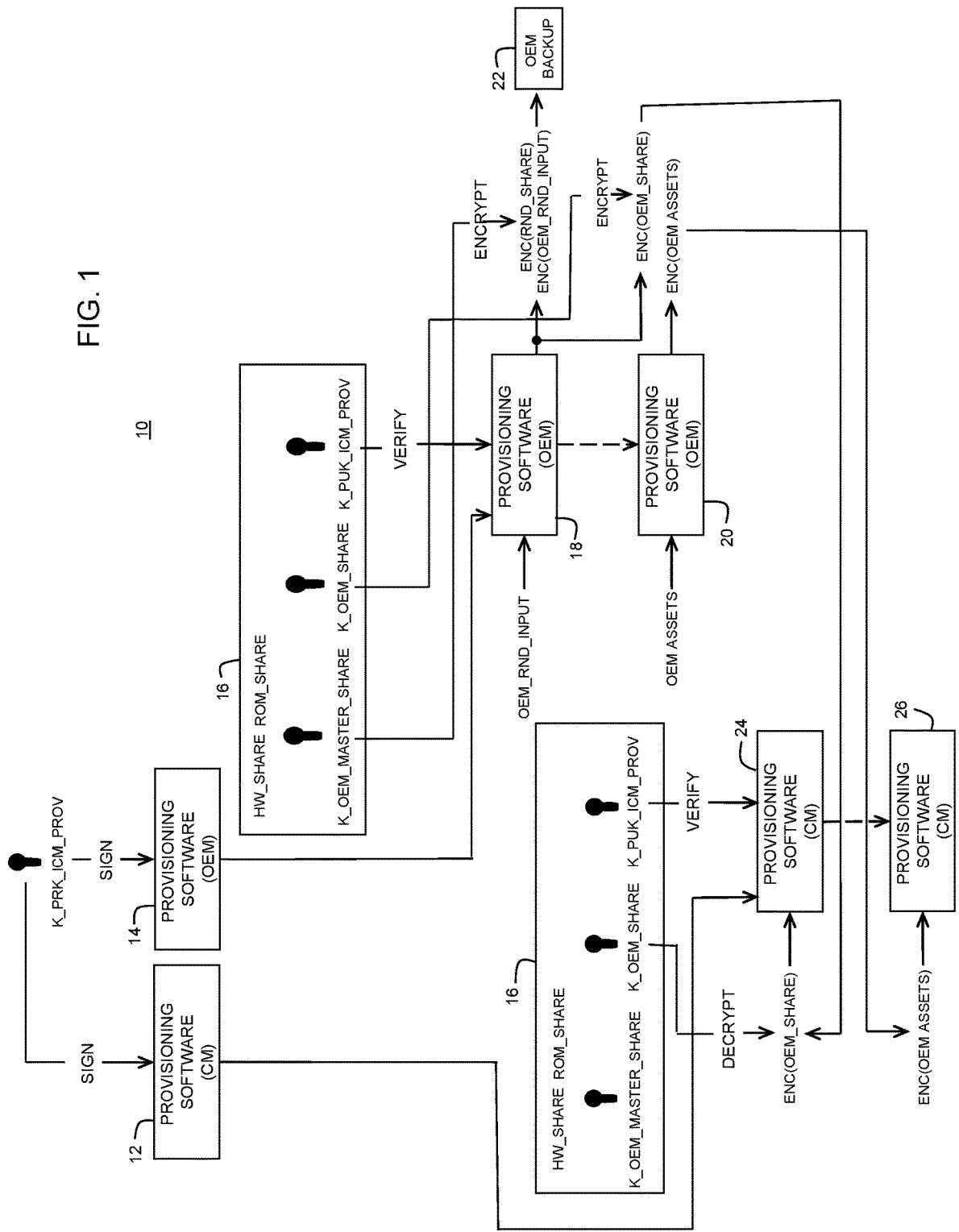
FIG. 1 illustrates a method for provisioning a device in accordance with an embodiment.

Generally, there is provided, a method for trust provisioning one or more devices using a provisioning device and provisioning software. The provisioning device and the device(s) being provisioned include one or more integrated circuits (ICs). The ICs are commonly made from silicon and may also be referred to as chips. In one embodiment, there is no functional difference between the provisioning device and the device(s) being provisioned. The provisioning software includes computer programs or other software implementations of algorithms, models, and methods, whether in source code, object code, human readable form, or other form, that is used to provision assets onto the devices being provisioned. In one embodiment, the provisioning software may be realized by firmware that is loaded onto and executed on the provisioning device, by commands provided by, e.g., read only memory (ROM) code, or other means. In one embodiment, the IC manufacturer (ICM) sells N devices to an original equipment manufacturer (OEM). To build the manufactured product, the OEM may outsource some or all the production to a contract manufacturer (CM). One or a few of the N devices include the provisioning software and are shipped to the OEM via a trusted channel to function as the provisioning device. The rest of the N devices may be shipped directly to the CM by the ICM. The CM is considered to be untrusted.

In one embodiment of a first stage of trust provisioning, the ICM adds intermediate assets such as keys and key shares to a provisioning device. The ICM provides the provisioning device with the provisioning software and intermediate assets to the OEM. The OEM verifies the provisioning software and prepares and loads its own provisioning assets onto the provisioning device. The provisioning device protects the confidentiality and integrity of the assets. The provisioning device is then provided to the CM. The CM provisions the OEM assets onto the devices to be provisioned in a secure manner.

The method provides a secure approach to protect the confidentiality and integrity of firmware during provisioning of a device in an unsecure environment. The provisioning can be performed without an online connection or HSM, thus lowering the cost of provisioning.

In accordance with an embodiment, there is provided, a method for provisioning a plurality of IC devices, the method including: providing, by a first entity, a plurality of integrated circuit (IC) devices for use in a plurality of manufactured products; storing, by the first entity, in at least one IC device of the plurality of IC devices used as a provisioning device, one or more keys, and a public key; installing, by the first entity, provisioning software in the provisioning device; signing, by the first entity, the provisioning software using a private key, the private key corresponding to the public key; providing the provisioning device with the signed provisioning software to a second entity, wherein the second entity verifies the provisioning software using the public key, and wherein the provisioning software encrypts assets provided by the second entity; providing the signed provisioning software to a third entity; and receiving, by the signed provisioning software, the encrypted assets from the second entity, wherein during the manufacturing of the manufactured products by the third entity, the provisioning software verifies and decrypts the encrypted assets of the second entity to provision all the plurality of IC devices. Storing, by the first entity, in the provisioning device, may further include storing the one or more keys, and a public key in an immutable portion in the provisioning device. Providing the at least one IC device with the signed provisioning software to a second entity may further include: generating, by the provisioning software, a master key; using one or more key derivation functions with the master key to derive one or more symmetric keys; and using the one or more symmetric keys to encrypt and sign assets provided by the second entity to create the encrypted assets. The method may further include: receiving, by the provisioning software, a random input from the second entity; generating, by the provisioning software, a random share; generating a second entity share from the random share and the random input using a cryptographic function; encrypting the second entity share with one of the one or more keys to create an encrypted second entity share; and providing the encrypted second entity share to the third entity. The method may further include: executing the provisioning software on all the plurality of IC devices to be provisioned; providing the encrypted second entity share to the provisioning software; decrypting the encrypted second entity share to provide a decrypted second entity share; recreating the master key using the decrypted second entity share; using one or more key derivation functions with the master key to derive one or more symmetric keys; and using the one or more symmetric keys to decrypt and verify the assets provided by the second entity to create the encrypted assets. The provisioning software may encrypt the assets provided by the second entity using advanced encryption standard Galois/counter mode (AES GCM) or advanced encryption standard counter with cipher block chaining message authentication code (AES CCM). The method may further include executing the provisioning software on all the plurality of IC devices to verify the received encrypted assets using cipher-based message authentication code (CMAC). The first entity may be a manufacturer of the plurality of IC devices, the second entity may be a trusted manufacturer of the plurality of manufactured products, and the third entity may be an untrusted manufacturer contracted by the second entity to manufacture the plurality of manufactured products. The method may further include: receiving, by the provisioning software, a random input from the second entity; generating, by the provisioning software, a random share; encrypting the random input and the random share using a key of the one or more keys; storing the encrypted random input and the encrypted random share. The method may further include: providing the encrypted random input and the encrypted random share to the provisioning device; decrypting both the encrypted random input and the encrypted random share using one of the one or more keys; generating, by the provisioning software, a master key using the decrypted random input and the decrypted random share; deriving one or more symmetric keys using the master key; using the one or more symmetric keys to encrypt and sign assets provided by the second entity to create encrypted assets; and using the encrypted assets to provision another plurality of IC devices.

In another embodiment, there is provided, a method for provisioning a plurality of IC devices, the method including: providing, by a first entity, a plurality of integrated circuit (IC) devices for use in a plurality of manufactured products; storing, by the first entity, in at least one IC device of the plurality of IC devices used as a provisioning device, one or more keys and a public key used for provisioning the plurality of IC devices, wherein the provisioning device is substantially functionally the same as the plurality of IC devices; installing, by the first entity, provisioning software in the provisioning device; signing, by the first entity, the provisioning software using a private key, the private key corresponding to the public key; providing the provisioning device with the signed provisioning software to a second entity, wherein the second entity verifies the provisioning software using the public key, and wherein the provisioning software encrypts assets provided by the second entity; providing the signed provisioning software to a third entity; enabling the third entity to verify the provisioning software using the public key; and receiving, by the signed provisioning software, the encrypted assets from the second entity, wherein during the manufacturing of the manufactured products by the third entity, the provisioning software verifies and decrypts the encrypted assets of the second entity to provision all the plurality of IC devices. Storing, by the first entity, in the provisioning device, may further include storing the one or more keys, and a public key in an immutable portion in the provisioning device. Providing the at least one IC device with the signed provisioning software to a second entity may further include: generating, by the provisioning software, a master key; using one or more key derivation functions with the master key to derive one or more symmetric keys; and using the one or more symmetric keys to encrypt and sign assets provided by the second entity to create the encrypted assets. The method may further include: receiving, by the provisioning software, a random input from the second entity; generating, by the provisioning software, a random share; generating from the random share, the random input, and a cryptographic function, a second entity share; encrypting the second entity share with one of the one or more keys to create an encrypted second entity share; and providing the encrypted second entity share to the third entity. The method may further include: executing the provisioning software on all the plurality of IC devices to be provisioned; providing the encrypted second entity share to the provisioning software; decrypting the encrypted second entity share to provide a decrypted second entity share; recreating the master key using the decrypted second entity share; using one or more key derivation functions with the master key to derive one or more symmetric keys; and using the one or more symmetric keys to decrypt and verify the assets provided by the second entity to create the encrypted assets. The provisioning software may encrypt the assets provided by the second entity using advanced encryption standard Galois/counter mode (AES GCM) or advanced encryption standard counter with cipher block chaining message authentication code (AES CCM). The method may further include executing the provisioning software on all the plurality of IC devices to verify the received encrypted assets using cipher-based message authentication code (CMAC). The first entity may be a manufacturer of the plurality of IC devices, the second entity may be a trusted manufacturer of the plurality of manufactured products, and the third entity may be an untrusted manufacturer contracted by the second entity to manufacture the plurality of manufactured products. The method may further include: receiving, by the provisioning software, a random input from the second entity; generating, by the provisioning software, a random share; encrypting the random input and the random share using a key of the one or more keys; storing the encrypted random input and the encrypted random share. The method may further include: providing the encrypted random input and the encrypted random share to the provisioning device; decrypting the encrypted random input and the encrypted random share using one of the one or more keys; generating, by the provisioning software, a master key using the decrypted random input and the decrypted random share; deriving one or more symmetric keys using the master key; using the one or more symmetric keys to encrypt and sign assets provided by the second entity to create encrypted assets; and using the encrypted assets to provision another plurality of IC devices.

FIG. 1 illustrates method 10 for provisioning a device in accordance with an embodiment. A "provisioning device" denotes a single or a few devices, which an IC manufacturer ships to the OEM to be used to provision a plurality of IC devices. Note that in one embodiment, there is no functional or other difference between the provisioning device and the devices that require provisioning. The "provisioning software" refers to computer programs, including all software implementations of algorithms, models and methodologies, whether in source code, object code, human readable form or other form, that are used to provision assets onto a device. The provisioning software may be realized by firmware that is loaded onto and executed on the device, by commands provided by the device ROM code, or any other means. An "asset" refers to cryptographic material such as keys, certificates, or shares, as well as computer programs, including all software implementations of algorithms, models and methodologies, whether in source code, object code, human readable form or other form, device configuration data, or any other data inserted into or generated on a device.

Assume that the ICM sells N IC devices to the OEM. One (or a few) of the N IC devices which it ships to the OEM using a trusted channel will function as provisioning devices, and N−1 of the devices may be shipped directly to the CM where the actual provisioning will take place. Note than N is typically in the order of thousands or even millions of devices. A multi-stage approach to provisioning is described, with the first stage being executed by the ICM to insert intermediate assets such as keys and key shares into the memory of the N−1 IC devices.

The OEM uses the received provisioning device to generate its own assets and protect their confidentiality and integrity before sending them over to the CM. The OEM does this by contributing its own share, making sure different assets and different internal keys used to protect those assets are derived for different OEMs. In FIG. 1, an immutable memory 16 of the provisioning device (not shown in FIG. 1) is used to store the intermediate assets inserted by the ICM. The second provisioning stage is executed by the OEM and prepares the provisioning software for use in a final stage by the CM to provision the OEM assets onto the provisioned devices in a secure manner. These stages might be combined, or further split based on product or implementation requirements.

When manufacturing the N IC devices, the ICM will install several secret values (so-called secret shares or intermediate assets) in an immutable portion 16 of the IC device, e.g., hardware logic or ROM. These shares are labeled "HW_SHARE" and "ROM_SHARE", respectively, in FIG. 1. The number of secret shares is not limited to two and all the devices will have the same set of secret shares installed.

Besides the secret shares, the ICM may also install a public key labeled "K_PUK_ICM_PROV", where the corresponding private key labeled "K_PRK_ICM_PROV" is used by the ICM to sign the provisioning software. The signed provisioning software is provided to the CM at step 12 and to the OEM at step 14. Finally, the ICM will also install two secret keys which will be used to encrypt some of the inputs provided by the OEM. These secret keys are labeled "K_OEM_SHARE" and "K_OEM_MASTER_SHARE". Note that these keys can be constructed using some of the pre-installed secret shares. The signed provisioning software from the ICM will be executed on the provisioning device. At step 18, the provisioning software is verified by the OEM using public key K_PUK_ICM_PROV. Also, the OEM will provide a random value (e.g., a 128-bit or 256-bit random number), which will be entered into the provisioning device. The random value is labeled "OEM_RND_INPUT" at step 18. The provisioning device will then encrypt, by executing the provisioning software at step 18 with random share RND_SHARE and random value OEM RND INPUT. These encrypted values will be saved at step 22 for use later if needed to reprovision the devices or add new assets to the provisioned devices (see FIG. 4). Also, at step 18, the OEM will compute a share labeled "OEM_SHARE" from RND_SHARE AND OEM_RANDOM_INPUT. The OEM_SHARE is encrypted with K_OEM_SHARE and provided to the CM. At step 20, the OEM provides OEM assets labeled "OEM ASSETS" to the provisioning software. The OEM ASSETS is encrypted as discussed below in more detail in the discussion of FIG. 2.

The CM receives ENC(OEM_SHARE) and ENC(OEM_ASSETS) from the OEM. Using the provisioning software provided by the ICM at step 12, and executed by the IC devices that need provisioning at step 24, the CM decrypts ENC(OEM_SHARE) for use in encrypting and provisioning the OEM assets, at step 26, to the N−1 devices that require provisioning. This stage is discussed below in more detail in the discussion of FIG. 3. The method provides a secure way to provision devices without requiring a secure environment and without an online connection or HSM.

Figure 2:
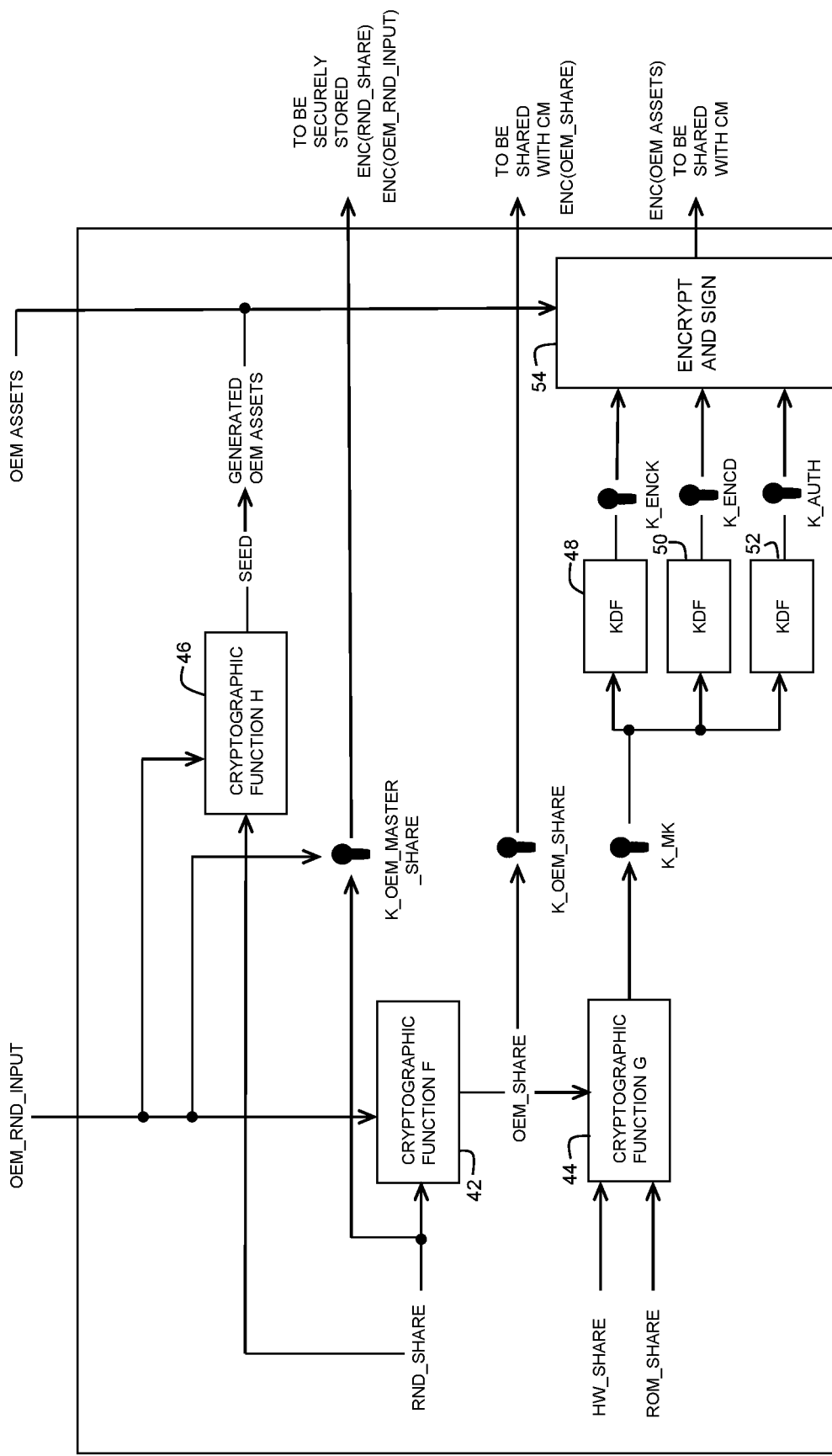
FIG. 2 illustrates the OEM key generation portion of the method of FIG. 1 in more detail.

FIG. 2 illustrates the OEM key generation portion of method 10 of FIG. 1 in more detail. This portion of the method is performed by the provisioning software as executed by the provisioning device. In FIG. 2, provisioning software 40 will receive the OEM_RND_INPUT from the OEM. Provisioning software 40 will then generate a random share RND_SHARE and compute OEM_SHARE by securely combining the two values, i.e., OEM_SHARE=F (OEM_RND_INPUT, RND_SHARE), where function F at step 42 can be a simple exclusive OR (XOR) or a more complex cryptographic function. As can be seen in FIG. 2, the provisioning software 40 will encrypt OEM_RND_INPUT and RND_SHARE with K_OEM_MASTER_SHARE and return the encrypted values to the OEM to be securely stored. The OEM will securely store these two values for later use with the provisioning software in case more assets need to be encrypted and sent to the CM for provisioning, or another plurality of the same IC devices needs to be provisioned.

Provisioning software 40 will then combine OEM_SHARE, HW_SHARE and ROM_SHARE with a cryptographic function G at step 44 to obtain a master key K_MK. From this key, provisioning software 40 will derive secret symmetric keys that will be used to protect the confidentiality and integrity of OEM ASSETS that the OEM needs to provision to all the devices at the CM facility. Key derivation functions 48, 50, and 52 will be used to produce the symmetric keys. These keys are labeled as "K_ENCK," "K_ENCD," and "K_AUTH." Next, while the provisioning software is still running, the OEM will download its assets "OEM ASSETS", or it will request provisioning software 40 to generate OEM Assets (GENERATED OEM ASSETS) using OEM_RND_INPUT and RND_SHARE combined with a cryptographic function H as a seed at step 46. The provisioning device will receive or generate the assets, encrypt them using one of the two encryption keys K_ENCK and K_ENCD, and sign them using authentication key K_AUTH to produce encrypted and signed assets at step 54. In another embodiment, cipher-based message authentication code (CMAC) may be used instead. This could also be done with even more or fewer keys, especially when using an authenticated encryption scheme instead of separate encryption and authentication. Provisioning software 40 will then provide OEM Assets at step 54 encrypted and signed to the CM. It will also return OEM_SHARE encrypted with K_OEM_SHARE to produce ENC(OEM_SHARE) and send to the CM.

Figure 3:
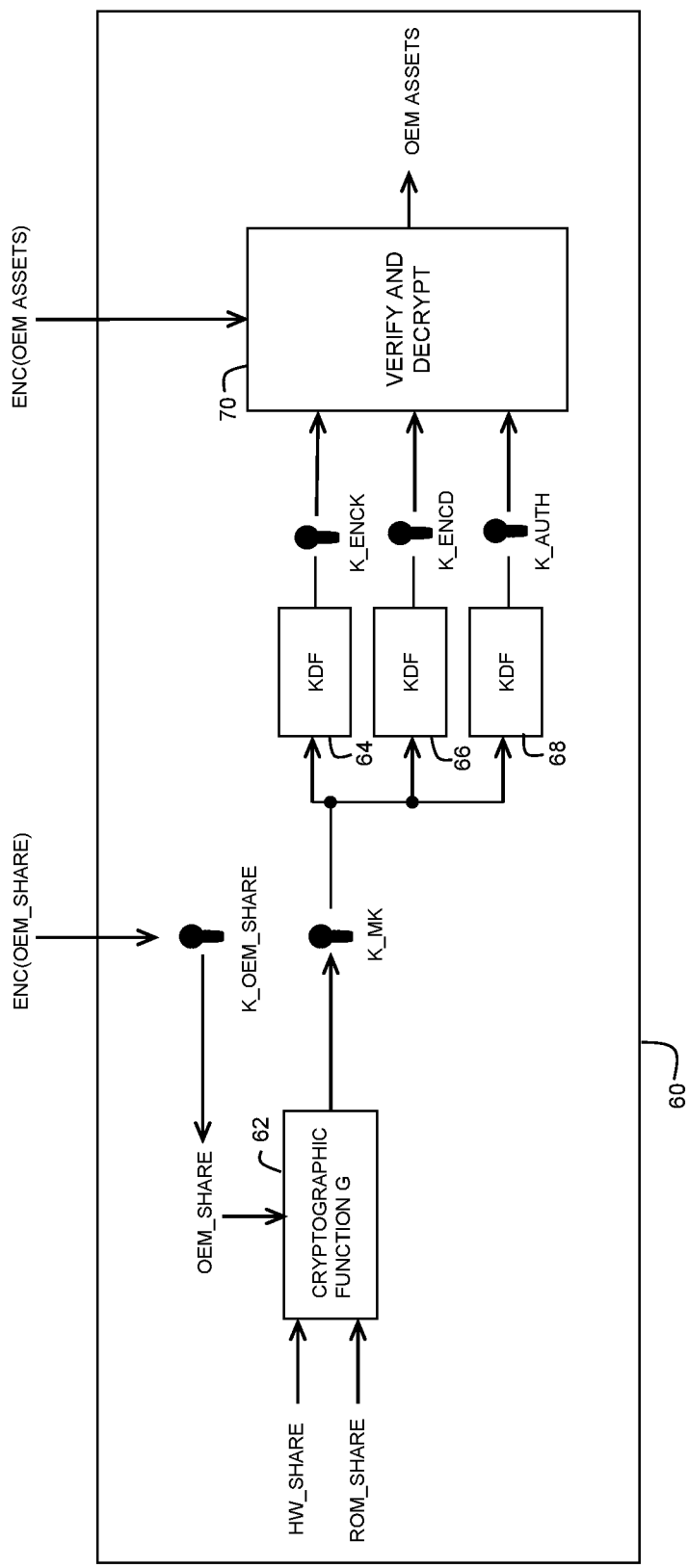
FIG. 3 illustrates the CM portion of the method of FIG. 1 in more detail.

FIG. 3 illustrates the CM portion of method 10 of FIG. 1 in more detail. The CM executes provisioning software 60 on all the N−1 devices that require provisioning. The devices requiring provisioning will verify and execute provisioning software 60. The CM will download encrypted and signed assets ENC(OEM ASSETS), as well as the encrypted ENC(OEM_SHARE) to all the devices that require provisioning. These were generated by the OEM as illustrated in FIG. 2. ENC(OEM_SHARE) is decrypted using key K_OEM_SHARE. Cryptographic function G at step 62 receives the HW_SHARE and ROM_SHARE that was pre-installed by the ICM to compute master key K_MK. Master key K_MK is then provided to KDFs 64, 66, and 68 to derive keys K_ENCK, K_ENCD, as well as authentication key K_AUTH (or whatever number of keys are used/needed). The device being provisioned will then verify that all the received assets have been signed by K_AUTH. In another embodiment, cipher-based message authentication code (CMAC) may be used instead. If the verification passes, the provisioned device will use K_ENCK or K_ENCD to verify and decrypt the ENC(OEM_ASSETS) at step 70 and provision all the assets onto the device to produce verified and decrypted OEM assets. The verified and decrypted OEM assets are then loaded to the appropriate storage or other portions of the provisioned devices.

Figure 4:
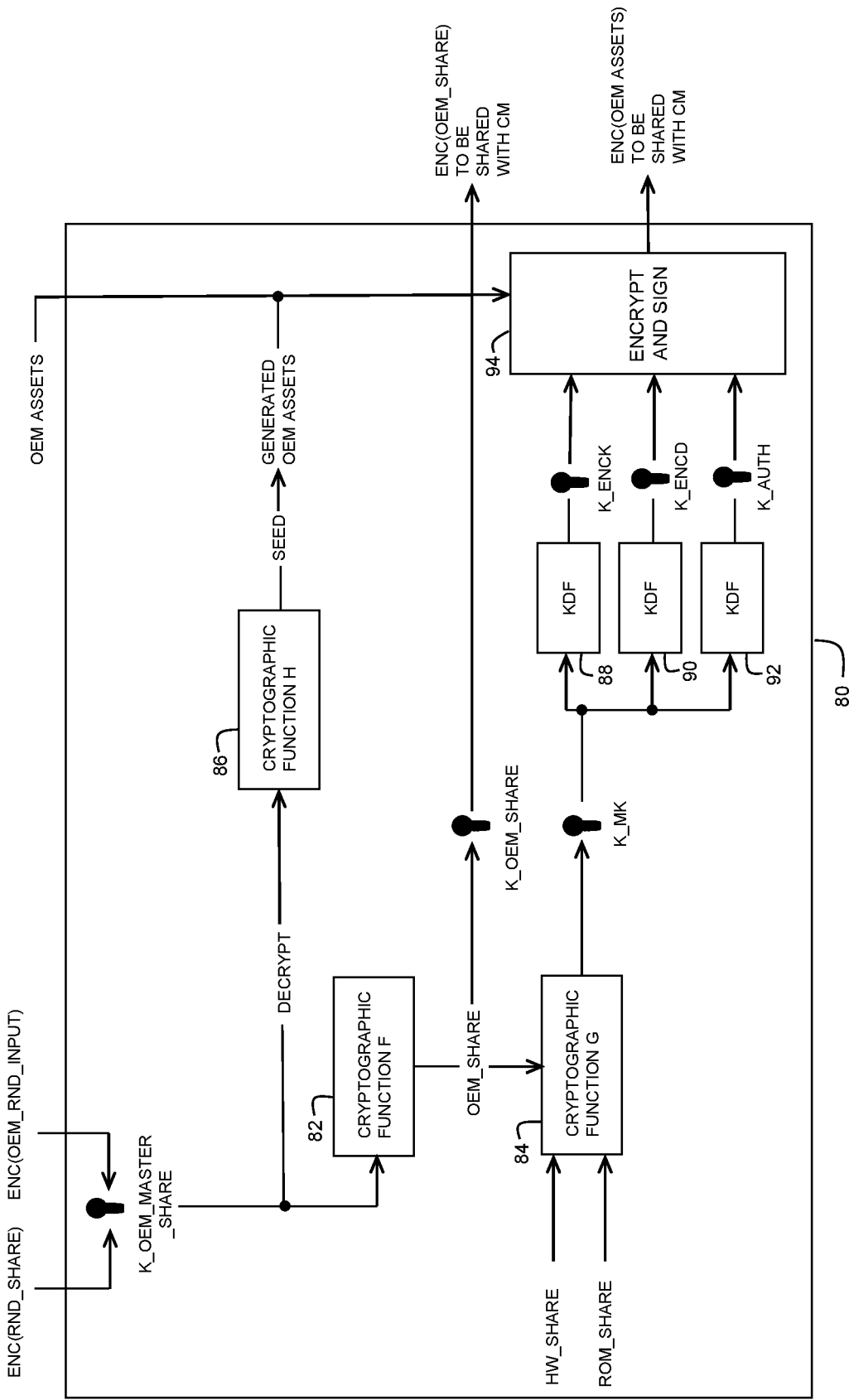
FIG. 4 illustrates OEM key regeneration method for reconstructing the OEM assets constructed from the OEM key generation method of FIG. 2.

FIG. 4 illustrates OEM key regeneration method for reconstructing the OEM assets constructed from the OEM key generation method of FIG. 2. If, at any time, the OEM wants to generate new or re-generate previous OEM assets using the provisioning device, the OEM will be able to do so by supplying encrypted RND_SHARE "ENC(RND_SHARE)" and encrypted OEM_RND_INPUT "ENC(OEM_RND_INPUT)" to the provisioning device by running provisioning software 80 on the provisioning device. The provisioning device will decrypt ENC(OEM_RND_INPUT) and ENC(RND_SHARE) using K_OEM_MASTER_SHARE which was loaded to the provisioning device by the ICM (see FIG. 1). The provisioning device will compute OEM_SHARE by securely combining the two values OEM_RND_SHARE and RND_SHARE. That is, OEM_SHARE=F(OEM_RND_INPUT, RND_SHARE), where function F at step 82 can be a simple exclusive OR (XOR) or a more complex cryptographic function as mentioned above in the discussion of FIG. 2. At step 84, a cryptographic function G is used with HW_SHARE ROM_SHARE, and OEM_SHARE to generate master key K_MK. The provisioning device will also derive K_ENCK, K_ENCD and K_AUTH using KDFs 88, 90, and 92 to produce K_ENCK, K_ENCD, and K_AUTH. Other embodiments may produce a different number of symmetrical keys. The provisioning device will then accept new OEM ASSETS, or it will re-generate previous OEM Assets using OEM_RND_INPUT and RND_SHARE combined with a cryptographic function H as a seed at step 86. Finally, the provisioning device will return encrypted and signed OEM Assets at step 94, and encrypted OEM_SHARE. The ENC(OEM_SHARE) and ENC(OEM ASSETS) will be shared with the CM.

Figure 5:
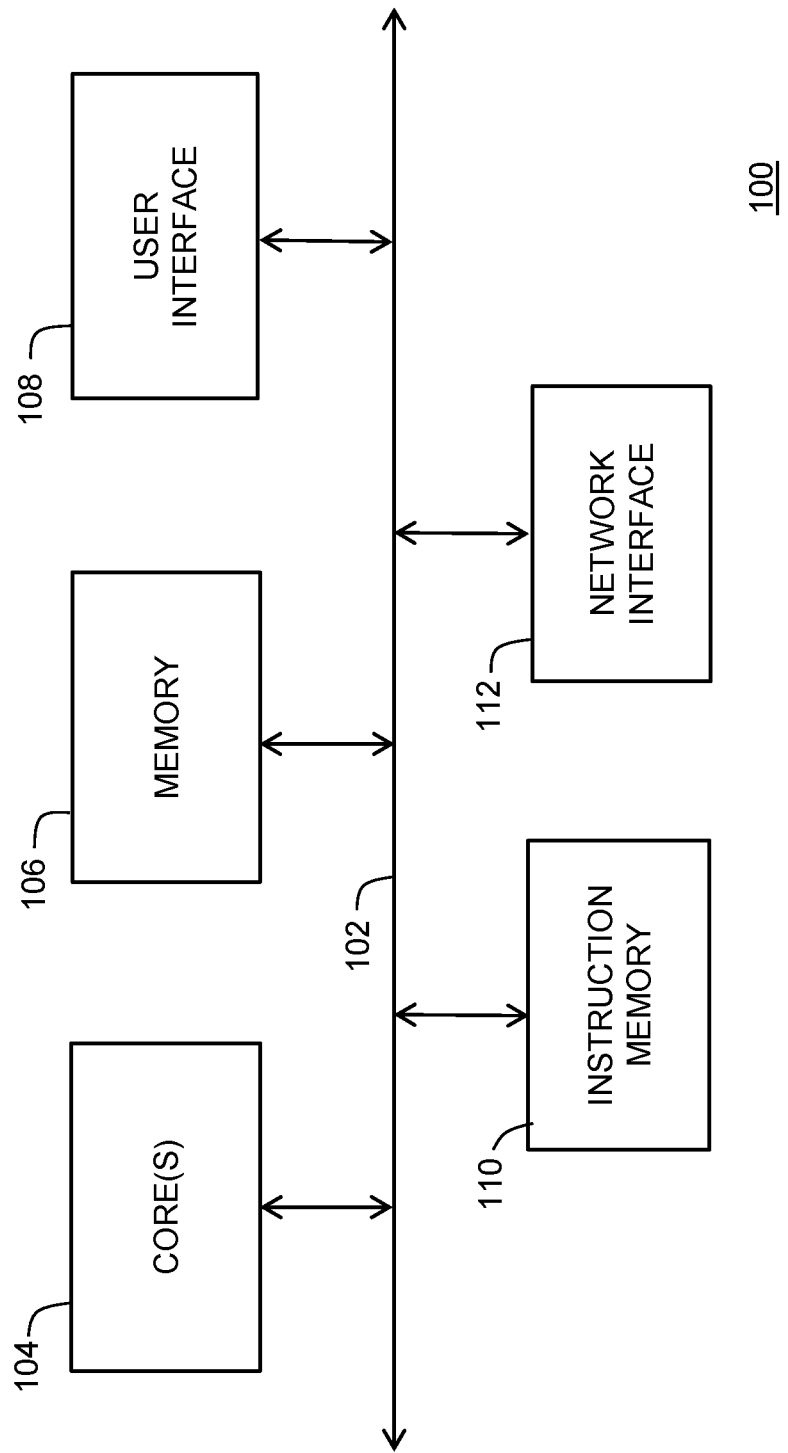
FIG. 5 illustrates a data processing system useful for implementing a provisioning device or a provisioned device.

FIG. 5 illustrates data processing system 100 useful for implementing a provisioning device or a provisioned device in accordance with an embodiment. In one embodiment, as described above, the provisioning device and the provisioned device are the same type of device. Data processing system 100 may be implemented on one or more integrated circuits. Data processing system 100 includes bus 102. In another embodiment, bus 102 may be a switch network. Connected to bus 102 is one or more processor core(s) 104, memory 106, user interface 108, instruction memory 110, and network interface 112. The one or more processor cores 104 may include any hardware device capable of executing instructions such as the provisioning software. The provisioning software may be stored in memory 106 or instruction memory 110. Processor cores 104 may be, for example, a microprocessor, field programmable gate array (FPGA), application-specific integrated circuit (ASIC), or similar device. Processor cores 104 may be implemented in a secure hardware element and may be tamper resistant.

Memory 106 may be any kind of memory, such as for example, L1, L2, or L3 cache or system memory. Memory 106 may include volatile memory such as static random-access memory (SRAM) or dynamic RAM (DRAM), or may include non-volatile memory such as flash memory, read only memory (ROM), or other volatile or non-volatile memory. Also, memory 106 may be implemented in a secure hardware element and may be immutable such as immutable memory 16 of FIG. 1. Alternately, memory 106 may be a hard drive implemented externally to data processing system 100. In one embodiment, memory 106 may be used to store assets for provisioning, random numbers, or other data.

User interface 108 may be connected to one or more devices for enabling communication with a user such as an administrator. For example, user interface 108 may be enabled for coupling to a display, a mouse, a keyboard, or other input/output device. Network interface 112 may include one or more devices for enabling communication with other hardware devices. For example, network interface 112 may include, or be coupled to, a network interface card (NIC) configured to communicate according to the Ethernet protocol. Also, network interface 112 may implement a TCP/IP stack for communication according to the TCP/IP protocols. Data samples for classification may be input via network interface 112, or similar interface. Various other hardware or configurations for communicating are available.

Instruction memory 110 may include one or more non-transient machine-readable storage media for storing instructions for execution by processor cores 104. In other embodiments, both memories 106 and 110 may store data upon which processor cores 104 may operate. Memories 106 and 110 may also store, for example, encryption, decryption, and verification applications. Memories 106 and 110 may be implemented in a secure hardware element and be tamper resistant.

The method is flexible and may be adapted for different needs of OEMs such as internet of things (IoT) device manufacturers. Multiple data types encrypted with different keys can be easily supported. Also, different types of keys and algorithms can be used, or the method may be adapted to different strategies for updating keys.

Encryption algorithms that may be used are advanced encryption standard Galois/counter mode AES GCM or advanced encryption standard counter with cipher block chaining message authentication code AES CCM. Besides protecting the confidentiality of the message, these two modes also protect integrity and authenticity of the message, which is something the device will be verifying prior to provisioning the OEM Assets. In another embodiment, any other authenticated encryption or "encrypt then MAC" algorithm could be used, but the two mentioned ones are probably the most well-known and used authentication codes. Depending on the choice no separate authentication key K_AUTH may be needed. Also, only one encryption key might be used instead of the recommended split into key-encryption "K_ENCK" and data encryption "K_ENCD". In another embodiment, more keys could be derived and used, but the split into these three is probably sufficient for most use cases. Instead of using only symmetric algorithms one might also chose asymmetric algorithms like elliptic curve digital signature algorithm (ECDSA) or Rivest-Shamir-Adleman (RSA), but since the provisioning software at the CM side computes a secret or private key for decryption, the benefit of such an approach is limited. Another aspect is to protect access to the used keys and decrypted/installed assets, such that they could not be abused or read back later. That could for example be done by locking the provisioned devices, which usually would correspond to an advance in the lifecycle state. Also, a device-internal write-only key-store could be used. The interface of the provisioning software should only allow the herein mentioned use cases, otherwise the assets might not be protected anymore. Also, the provisioning method mainly protects the confidentiality of the assets, but since the CM could also use the devices in the role of an OEM, the CM could easily provision assets supplied by the CM. However, the assets supplied by the CM could not be mixed with the assets requiring protection by the OEM.

Various embodiments, or portions of the embodiments, may be implemented in hardware or as instructions on a non-transitory machine-readable storage medium including any mechanism for storing information in a form readable by a machine, such as a personal computer, laptop computer, file server, smart phone, or other computing device. The non-transitory machine-readable storage medium may include volatile and non-volatile memories such as read only memory (ROM), random access memory (RAM), magnetic disk storage media, optical storage medium, flash memory, and the like. The non-transitory machine-readable storage medium excludes transitory signals.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for provisioning a plurality of IC devices, the method comprising:
   providing, by a first entity, a plurality of integrated circuit (IC) devices for use in a plurality of manufactured products;
   storing, by the first entity, in at least one IC device of the plurality of IC devices used as a provisioning device, one or more keys, and a public key;
   installing, by the first entity, provisioning software in the provisioning device;
   signing, by the first entity, the provisioning software using a private key, the private key corresponding to the public key;
   providing the provisioning device with the signed provisioning software to a second entity, wherein the second entity verifies the provisioning software using the public key, and wherein the provisioning software encrypts assets provided by the second entity;
   providing the signed provisioning software to a third entity; and
   receiving, by the signed provisioning software, the encrypted assets from the second entity,
   wherein during the manufacturing of the manufactured products by the third entity, the provisioning software verifies and decrypts the encrypted assets of the second entity to provision all the plurality of IC devices.

2. The method of claim 1, wherein storing, by the first entity, in the provisioning device, further comprises storing the one or more keys, and a public key in an immutable portion in the provisioning device.

3. The method of claim 1, wherein providing the at least one IC device with the signed provisioning software to a second entity further comprises:
   generating, by the provisioning software, a master key;
   using one or more key derivation functions with the master key to derive one or more symmetric keys; and
   using the one or more symmetric keys to encrypt and sign assets provided by the second entity to create the encrypted assets.

4. The method of claim 1, further comprising:
   receiving, by the provisioning software, a random input from the second entity;
   generating, by the provisioning software, a random share;
   generating a second entity share from the random share and the random input using a cryptographic function;
   encrypting the second entity share with one of the one or more keys to create an encrypted second entity share; and
   providing the encrypted second entity share to the third entity.

5. The method of claim 4, further comprising:
executing the provisioning software on all the plurality of IC devices to be provisioned;
providing the encrypted second entity share to the provisioning software;
decrypting the encrypted second entity share to provide a decrypted second entity share;
recreating the master key using the decrypted second entity share;
using one or more key derivation functions with the master key to derive one or more symmetric keys; and
using the one or more symmetric keys to decrypt and verify the assets provided by the second entity to create the encrypted assets.

6. The method of claim 4, wherein the provisioning software encrypts the assets provided by the second entity using advanced encryption standard Galois/counter mode (AES GCM) or advanced encryption standard counter with cipher block chaining message authentication code (AES CCM).

7. The method of claim 1, further comprising executing the provisioning software on all the plurality of IC devices to verify the received encrypted assets using cipher-based message authentication code (CMAC).

8. The method of claim 1, wherein the first entity is a manufacturer of the plurality of IC devices, the second entity is a trusted manufacturer of the plurality of manufactured products, and the third entity is an untrusted manufacturer contracted by the second entity to manufacture the plurality of manufactured products.

9. The method of claim 1, further comprising:
receiving, by the provisioning software, a random input from the second entity;
generating, by the provisioning software, a random share;
encrypting the random input and the random share using a key of the one or more keys;
storing the encrypted random input and the encrypted random share.

10. The method of claim 9, further comprising:
providing the encrypted random input and the encrypted random share to the provisioning device;
decrypting both the encrypted random input and the encrypted random share using one of the one or more keys;
generating, by the provisioning software, a master key using the decrypted random input and the decrypted random share;
deriving one or more symmetric keys using the master key;
using the one or more symmetric keys to encrypt and sign assets provided by the second entity to create encrypted assets; and
using the encrypted assets to provision another plurality of IC devices.

11. A method for provisioning a plurality of IC devices, the method comprising:
providing, by a first entity, a plurality of integrated circuit (IC) devices for use in a plurality of manufactured products;
storing, by the first entity, in at least one IC device of the plurality of IC devices used as a provisioning device, one or more keys and a public key used for provisioning the plurality of IC devices, wherein the provisioning device is substantially functionally the same as the plurality of IC devices;
installing, by the first entity, provisioning software in the provisioning device;
signing, by the first entity, the provisioning software using a private key, the private key corresponding to the public key;
providing the provisioning device with the signed provisioning software to a second entity, wherein the second entity verifies the provisioning software using the public key, and wherein the provisioning software encrypts assets provided by the second entity;
providing the signed provisioning software to a third entity;
enabling the third entity to verify the provisioning software using the public key; and
receiving, by the signed provisioning software, the encrypted assets from the second entity,
wherein during the manufacturing of the manufactured products by the third entity, the provisioning software verifies and decrypts the encrypted assets of the second entity to provision all the plurality of IC devices.

12. The method of claim 11, wherein storing, by the first entity, in the provisioning device, further comprises storing the one or more keys, and a public key in an immutable portion in the provisioning device.

13. The method of claim 11, wherein providing the at least one IC device with the signed provisioning software to a second entity further comprises:
generating, by the provisioning software, a master key;
using one or more key derivation functions with the master key to derive one or more symmetric keys; and
using the one or more symmetric keys to encrypt and sign assets provided by the second entity to create the encrypted assets.

14. The method of claim 11, further comprising:
receiving, by the provisioning software, a random input from the second entity;
generating, by the provisioning software, a random share;
generating from the random share, the random input, and a cryptographic function, a second entity share;
encrypting the second entity share with one of the one or more keys to create an encrypted second entity share; and
providing the encrypted second entity share to the third entity.

15. The method of claim 14, further comprising:
executing the provisioning software on all the plurality of IC devices to be provisioned;
providing the encrypted second entity share to the provisioning software;
decrypting the encrypted second entity share to provide a decrypted second entity share;
recreating the master key using the decrypted second entity share;
using one or more key derivation functions with the master key to derive one or more symmetric keys; and
using the one or more symmetric keys to decrypt and verify the assets provided by the second entity to create the encrypted assets.

16. The method of claim 14, wherein the provisioning software encrypts the assets provided by the second entity using advanced encryption standard Galois/counter mode (AES GCM) or advanced encryption standard counter with cipher block chaining message authentication code (AES CCM).

17. The method of claim 11, further comprising executing the provisioning software on all the plurality of IC devices to verify the received encrypted assets using cipher-based message authentication code (CMAC).

18. The method of claim 11, wherein the first entity is a manufacturer of the plurality of IC devices, the second entity is a trusted manufacturer of the plurality of manufactured products, and the third entity is an untrusted manufacturer contracted by the second entity to manufacture the plurality of manufactured products.

19. The method of claim 11, further comprising:
receiving, by the provisioning software, a random input from the second entity;
generating, by the provisioning software, a random share;
encrypting the random input and the random share using a key of the one or more keys;
storing the encrypted random input and the encrypted random share.

20. The method of claim 19, further comprising:
providing the encrypted random input and the encrypted random share to the provisioning device;
decrypting the encrypted random input and the encrypted random share using one of the one or more keys;
generating, by the provisioning software, a master key using the decrypted random input and the decrypted random share;
deriving one or more symmetric keys using the master key;
using the one or more symmetric keys to encrypt and sign assets provided by the second entity to create encrypted assets; and
using the encrypted assets to provision another plurality of IC devices.

* * * * *